(12) United States Patent
Yamazaki (10) Patent No.: US 6,714,357 B2
(45) Date of Patent: Mar. 30, 2004

(54) LENS DRIVE SYSTEM

(75) Inventor: Yoshihiro Yamazaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/325,960

(22) Filed: Dec. 23, 2002

(65) Prior Publication Data

US 2003/0117726 A1 Jun. 26, 2003

(51) Int. Cl.⁷ .......................... G02B 15/14; G02B 07/02
(52) U.S. Cl. ...................................... 359/696; 359/829
(58) Field of Search ................................ 359/696, 697, 359/703, 704, 823, 824, 821, 829; 353/101

(56) References Cited

U.S. PATENT DOCUMENTS

| | | | |
|---|---|---|---|
| 5,966,248 A | * 10/1999 | Kurokawa et al. | 359/697 |
| 6,434,334 B2 | 8/2002 | Ichinokawa | 396/144 |
| 6,501,604 B2 | * 12/2002 | Onda | 359/696 |
| 6,597,524 B2 | * 7/2003 | Sasaki | 359/811 |
| 2002/0093629 A1 | * 7/2002 | Watanabe | 353/101 |
| 2003/0118336 | * 6/2003 | Yamazaki | 396/79 |

FOREIGN PATENT DOCUMENTS

JP 07325242 A * 12/1995 ........... G02B/07/04

* cited by examiner

*Primary Examiner*—Ricky Mack
(74) *Attorney, Agent, or Firm*—Greenblum & Bernstein, P.L.C.

(57) ABSTRACT

A lens drive system includes a lens frame having a lens element; a nut member secured to the lens frame; a feed screw shaft having a male thread portion and a non-threaded portion, the male thread portion engaged with a screw hole of the nut member; an engagement portion formed on the nut member and having a deformable screw-engaging portion engaged with the male thread portion; and a motor for rotating the feed screw shaft. The screw-engaging portion is disengaged from the male thread portion when a large force is applied to the engagement portion in an axial direction. When the linear movement of the lens frame and the nut member is restricted during rotation of the feed screw shaft, the engagement portion remains on the male thread portion of the feed screw shaft while the female thread portion is moved onto the non-thread portion.

14 Claims, 5 Drawing Sheets

LENS DRIVE SYSTEM

BACKGROUND OF THE INVENTION

1. Field of the Invention

The present invention relates to a lens drive system using a feed screw for moving one or more lens groups.

2. Description of the Related Art

An optical instrument such as a camera which is provided with a lens drive system using a feed screw for moving one or more lens groups is known in the art.

Such a lens drive system is provided with a feed screw shaft on which a male thread portion is formed, a nut member which is provided with a female thread portion which is engaged with the male thread portion of the feed screw shaft, a motor for rotating the feed screw shaft, and a lens frame or a lens holder for holding one or more lens elements. Rotating the feed screw shaft by the motor causes the lens frame to move together with the nut member.

In such a conventional lens drive system, if the feed screw shaft continues to be rotated by the motor until the lens frame or the nut member abuts against another member and stops thereby, the nut member and the feed screw shaft, which are engaged with each other, tightly fasten themselves on each other. This sometimes makes any further rotation of the feed screw shaft relative to the nut member impossible.

To prevent such a problem from occurring, it is generally the case that operation of the motor is controlled so that the motor stops rotating immediately after a position sensor senses that the lens frame has reached a predetermined stop position before the lens frame or the nut member runs over the stop position and abuts against another member.

However, there is a possibility that the position sensor cannot sense for some reason that the lens frame reaches a predetermined position. In this case, the feed screw shaft continues to be rotated by the motor until the lens frame or the nut member abuts against another member and stops thereby. As a result, the nut member and the feed screw shaft tightly fasten themselves on each other. This sometimes makes any further movement of the lens frame impossible.

Since one or more lens groups have been required to be moved by motor with a high degree of precision in recent years, there has been a tendency to reduce the pitch of the feed screw of the lens drive system. This tendency makes it easy to cause the nut member and the feed screw shaft to tightly fasten or lock themselves on each other.

SUMMARY OF THE INVENTION

The present invention provides a lens drive system which can reliably prevent the aforementioned problems which reside in conventional lens drive systems wherein the nut member and the feed screw shaft sometimes tightly fasten themselves on each other.

According to an aspect of the present invention, a lens drive system includes a lens frame having at least one lens element; a nut member which is secured to the lens frame, the lens frame and the nut member being movable in an optical axis direction without rotating relative to a base of the lens drive system, the direction of a screw hole of the nut member being parallel with the optical axis; a feed screw shaft having a male thread portion and a non-threaded portion, the male thread portion being engaged with the screw hole of the nut member so that the male thread portion is engaged with a female thread portion formed on an inner peripheral surface of the screw hole, a diameter of the non-threaded portion being smaller than an inner diameter of the screw hole; an engagement portion formed on the nut member, the engagement portion having at least one deformable screw-engaging portion which is engaged with the male thread portion; and a motor for rotating the feed screw shaft. The engagement portion is forced by rotation of the feed screw shaft to move in an axial direction of the feed screw shaft. The screw-engaging portion is disengaged from the male thread portion so that the male thread portion idles with respect to the engagement portion when a force greater than a predetermined value is applied to the engagement portion via the rotation of the feed screw shaft in the axial direction thereof. When the linear movement of the lens frame and the nut member is restricted during the rotation of the feed screw shaft to move the nut member and the lens frame in a direction from the male thread portion toward the non-thread portion, the engagement portion of the nut member remains on the male thread portion of the feed screw shaft while the female thread portion of the nut member is disengaged from the male thread portion of the feed screw shaft to move onto the non-thread portion of the feed screw shaft.

If the feed screw shaft is rotated in a rotational direction reverse to the predetermined rotational direction by the motor in a state where the female thread portion of the nut member is positioned on the non-thread of the feed screw shaft, the engagement portion can be forced by a reverse rotation of the feed screw shaft by the motor so that the female thread portion of the nut member moves back onto the male thread portion.

It is desirable for the portion of the engagement portion to be resilient so that the screw-engaging portion can be disengaged from the male thread portion.

The screw-engaging portion can include at least one thread ridge which is engaged with the male thread portion of the feed screw shaft.

The screw-engaging portion can includes at least two screw-engaging portions which are engaged with the male thread portion of the feed screw shaft from different directions.

The engagement portion can include a guide portion for preventing the screw-engaging portion from being disengaged from the male thread portion, the engagement portion being deformed to allow the screw-engaging portion to be disengaged from the male thread portion when the force exerted on the engagement portion becomes greater than the predetermined value.

It is desirable for the lens drive system to include a biasing member for biasing the lens frame in a second direction from the non-threaded portion toward the male thread portion. The nut member presses the lens frame to move the lens frame toward the non-threaded portion when the lens frame is driven to move in the direction from the male thread portion toward the non-threaded portion. The lens frame moves toward the male thread portion by a biasing force of the biasing member when the lens frame is driven to move in the second direction from the non-threaded portion toward the male thread portion.

The lens drive system can be incorporated in a camera having a stop-position controller for optically detecting an axial position of the lens frame, for driving the motor in accordance with the detected axial position of the lens frame, and for stopping the lens frame at a predetermined axial position. If the stop-position controller malfunctions, the lens drive system operates to avoid an adverse effect on the lens drive system due to the malfunction.

It is desirable for at least a portion of the engagement portion to be resilient so that the guide portion can bend resiliently to allow the screw-engaging portion to be disengaged from the male thread portion when the force exerted on the engagement portion becomes greater than the predetermined value.

The lens element, which is held by the lens frame, can include a focusing lens group of a photographing optical system.

The lens drive system can be incorporated in a zoom lens barrel. The lens element, which is held by the lens frame, can include a rearmost lens group serving as a focusing lens group of a photographing optical system. The base can be formed as a part of a housing of the zoom lens barrel.

It is desirable for the lens frame to be linearly guided in an optical axis direction without rotating about the optical axis.

The lens drive system can further include a linear guide mechanism for linearly guiding the lens frame in an optical axis direction without making the lens frame rotate relative to the base. The linear guide mechanism can include a guide shaft extending parallel to the optical axis. The nut member can include a guide recess in which the guide shaft is engaged to be slidable on the guide shaft.

The screw-engaging portion includes at least two screw-engaging portions which are engaged with the male thread portion of the feed screw shaft from different directions. The guide portion is formed so that one of the at least two screw-engaging portions is provided on the opposite side of the feed screw shaft with respect to the other of the at least two screw-engaging portions.

The present disclosure relates to subject matter contained in Japanese Patent Application No. 2001-394387 (filed on Dec. 26, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 2:
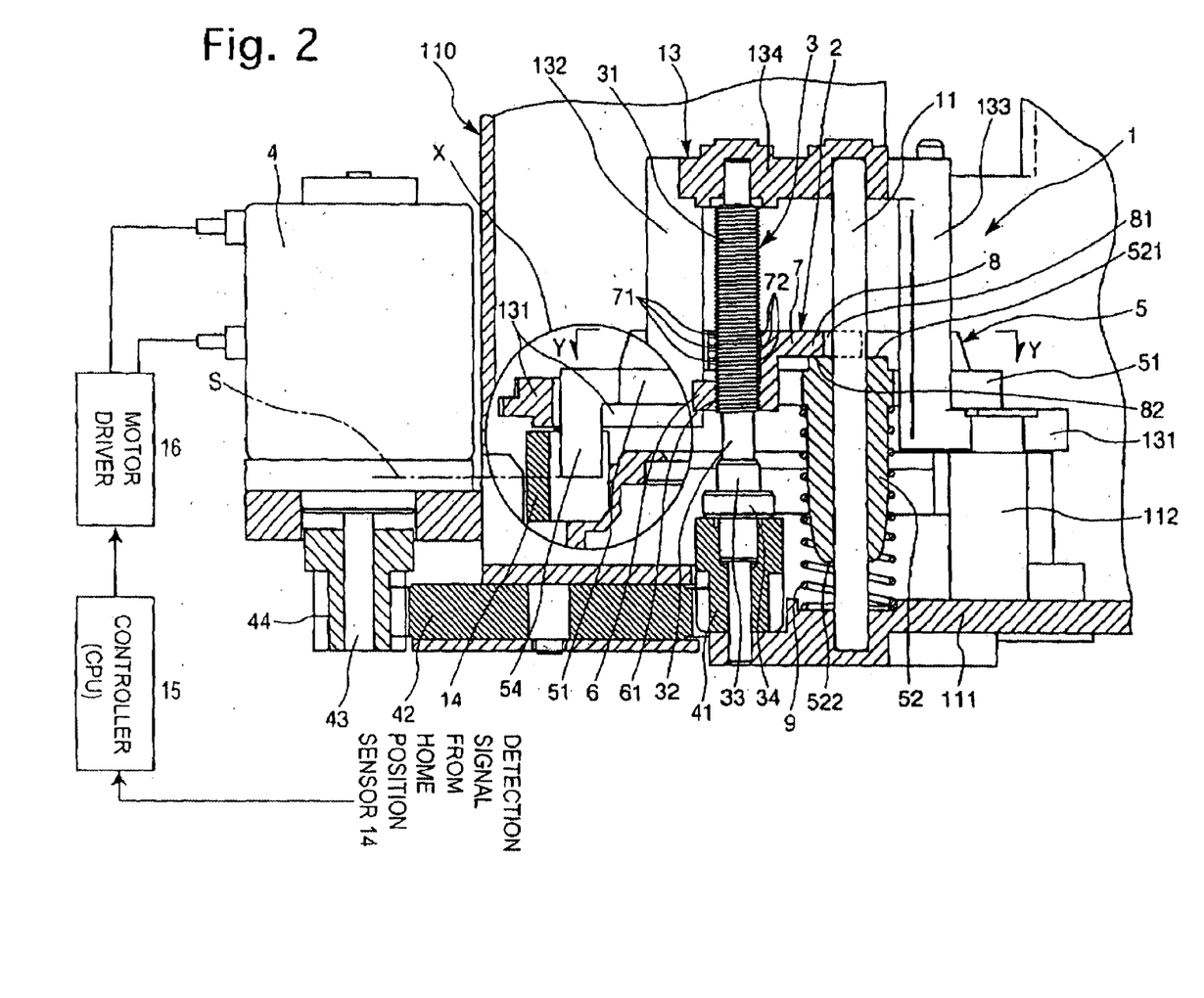
FIG. 2 is a cross sectional view of the lens drive system shown in FIG. 1, showing a state where a female thread portion of a nut member is engaged with a male thread portion of a feed screw shaft.
Figure 3:
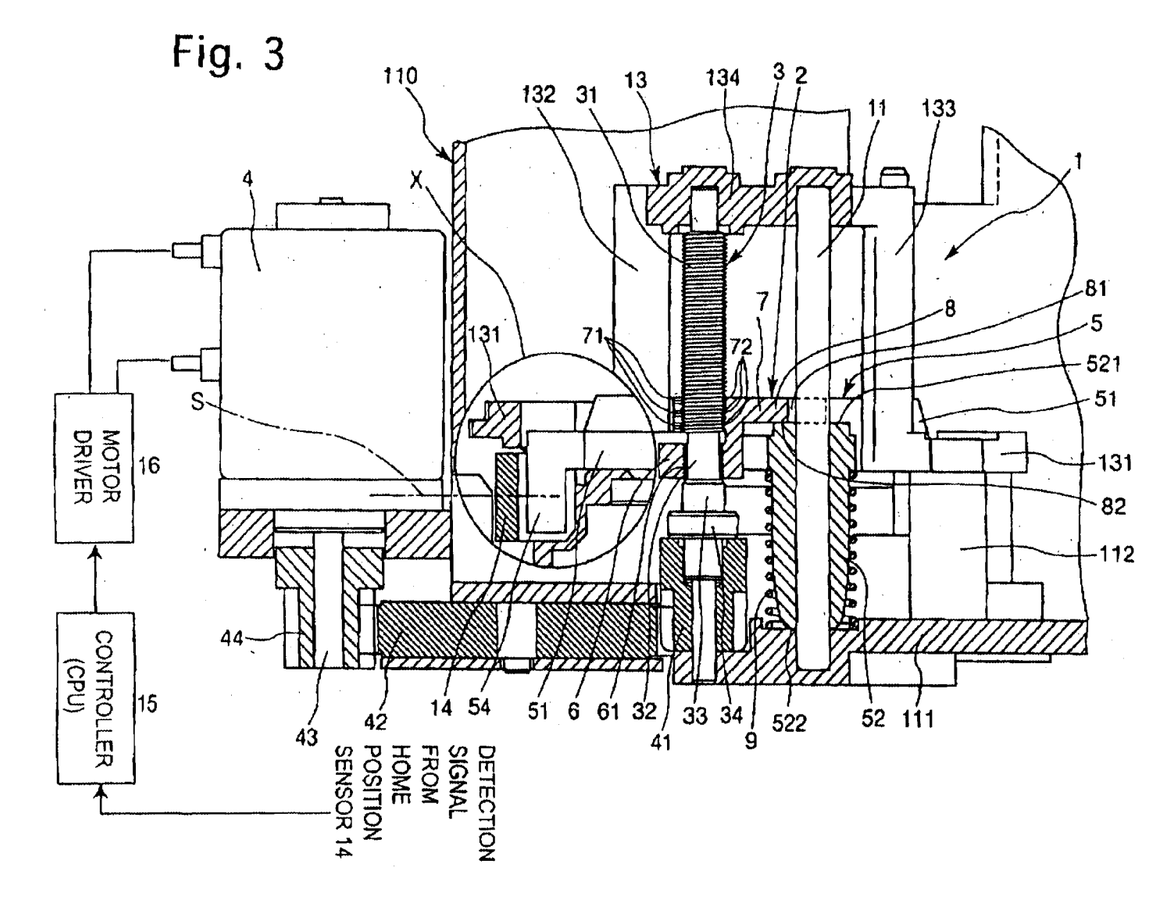
FIG. 3 is a view similar to that of FIG. 2, showing a state where the female thread portion of the nut member is positioned on a non-threaded portion of the feed screw shaft which is formed behind the male thread portion of the feed screw shaft.
Figure 5:
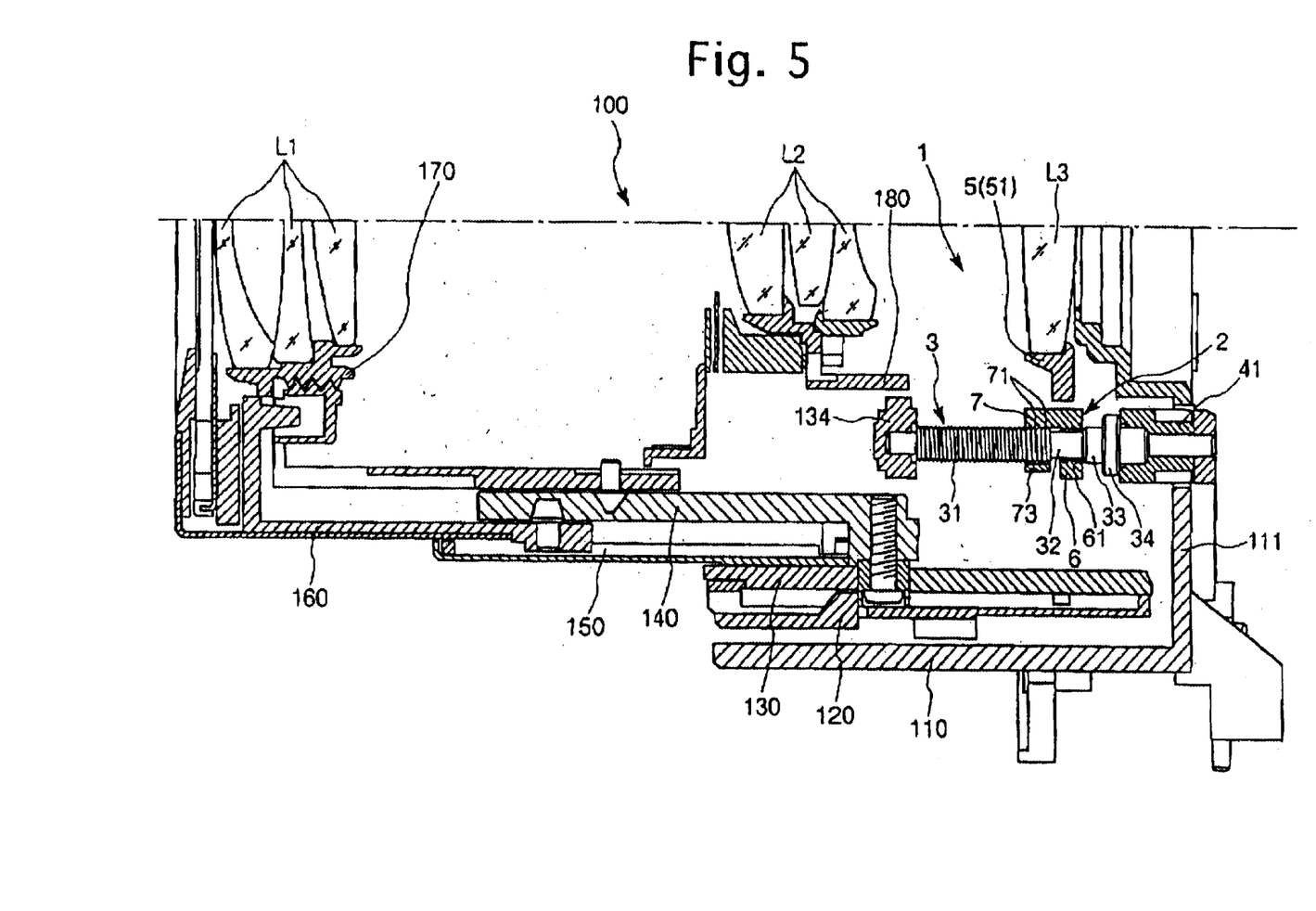
FIG. 5 is an axial cross sectional view, above an optical axis, of a lens barrel of a digital camera which incorporates the lens drive system shown in FIG. 1.

In the following description of an embodiment of a lens drive system, the upper side of the lens drive system as viewed in FIGS. 2 and 3 is referred to as the front side or object side of the lens drive system, while the lower side of the lens drive system as viewed in FIGS. 2 and 3 and also the right side of the lens drive system as viewed in FIG. 5 are each referred to as the rear side of the lens drive system. In FIGS. 2 and 3, a cross sectional view shown in a circle X is a cross sectional view of the lens drive system which is taken along a plane different from a plane along which a cross sectional view of the remaining portion of the lens drive system which is positioned outside the circle X is taken.

The lens drive system 1 is incorporated in a lens barrel 100 of a digital camera. The lens drive system 1 moves a third lens group L3 serving as a focusing lens group in a direction of a photographing optical axis O (i.e., optical axis direction) of the lens barrel 100.

First of all, the overall structure of the lens barrel 100 will be hereinafter discussed briefly. As shown in FIG. 5, the lens barrel 100 is provided with a photographing optical system constructed of three lens groups: a first lens group L1, a second lens group L2, and the aforementioned third lens group L3, in that order from the front side of the lens barrel 100, i.e., from the object side.

The lens barrel 100 is provided with a housing 110, a rotating ring 120, a stationary ring 130, a cam ring 140, an outer ring 150, an inner ring 160, a first lens frame 170 and a second lens frame 180. The housing 110 is fixed to a camera body (not shown). The rotating ring 120 is positioned inside the housing 110. The stationary ring 130 is positioned inside the rotating ring 120. The cam ring 140 is positioned inside the stationary ring 130. The outer ring 150 is positioned between the stationary ring 130 and the cam ring 140. The first lens frame 170 and the second lens frame 180 are positioned inside the cam ring 140.

The first lens group L1 is fixed to the first lens frame 170 while the second lens group L2 is fixed to the second lens frame 180.

The housing 110 and the stationary ring 130 are fixed to the camera body. Accordingly, each of the housing 110 and the stationary ring 130 does not move linearly in the optical axis direction or rotate about the optical axis O relative to the camera body.

The rotating ring 120 is driven to rotate about the optical axis O by a motor (not shown). The lens barrel 100 is provided with a plurality of mechanisms (the descriptions of which are omitted). One of the plurality of mechanisms includes a cam mechanism using a cam ring. If the rotating ring 120 rotates via the plurality of mechanisms, the cam ring 140 moves in the optical axis direction while rotating about the optical axis O. At the same time, the outer ring 150, the inner ring 160, the first lens frame 170 and the second lens frame 180 move in the optical axis direction.

Accordingly, the lens barrel 100 can change between an accommodation state (not shown) where all of the outer ring 150, the inner ring 160, the first lens frame 170 and the second lens frame 180 retreat into the housing 110 and a ready-to-photograph state shown in FIG. 5 where each of the outer ring 150, the inner ring 160, the first lens frame 170 and the second lens frame 180 advances from the housing 110. A zooming operation is carried out by moving the first and second lens groups L1 and L2 in the optical axis direction while varying the space therebetween.

A focusing operation is carried out by moving the third lens group L3 in the optical axis direction by the lens drive system 1. The lens drive system 1 will be hereinafter discussed in detail.

Figure 1:
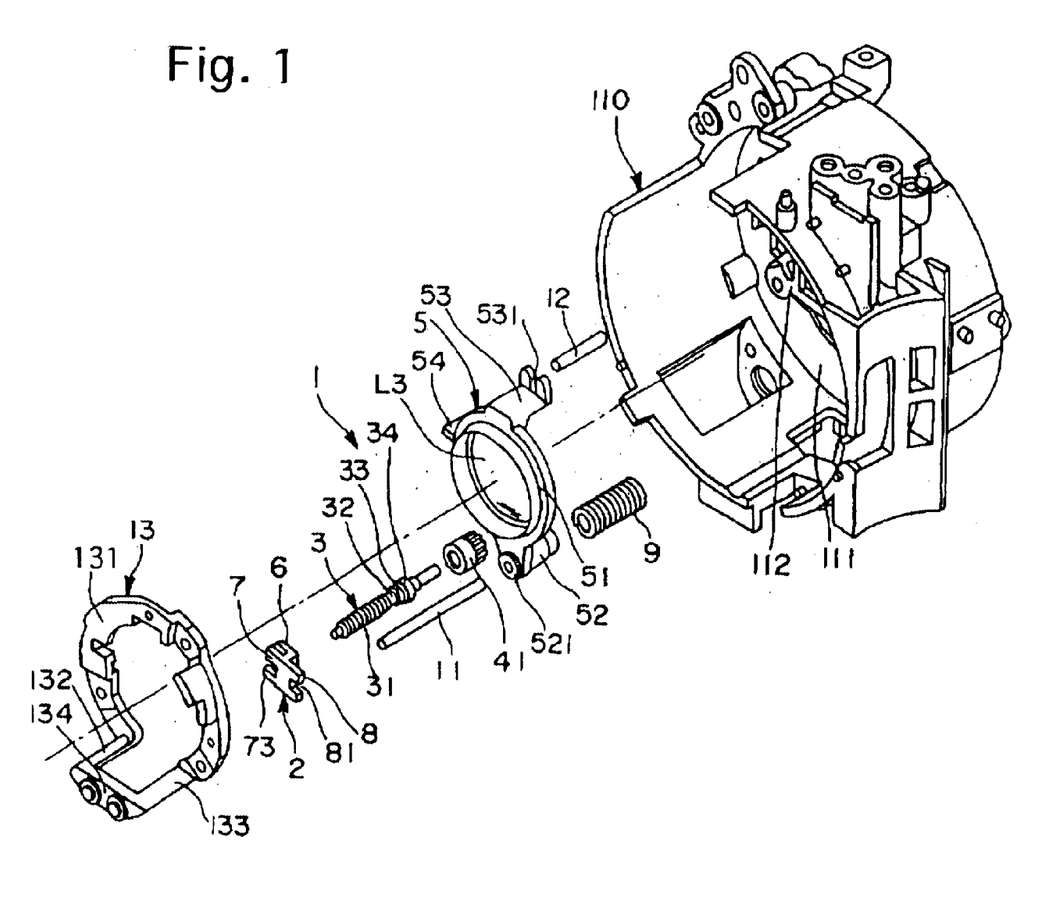
FIG. 1 is an exploded perspective view of an embodiment of a lens drive system according to the present invention.

As shown in FIGS. 1 and 2, the lens drive system 1 is provided with a nut member 2, a feed screw shaft 3, a motor 4, a third lens frame 5 and a helical compression spring 9. The nut member 2 is provided with a nut portion 6 having a screw hole, and is provided on an inner peripheral surface of the screw hole with a female thread portion 61. A male thread portion 31 of the feed screw shaft 3 is inserted into the screw hole of the nut portion 6 of the nut member 2 to be engaged with the female thread portion 61. The motor 4 rotates the feed screw shaft 3. The third lens frame 5 holds the third lens group L3, and moves together with the nut member 2 in the optical axis direction. The helical compression spring 9 serves as a biasing member which biases the third lens frame 5 forward in the optical axis direction.

The third lens frame 5 is positioned in the housing 110 to be supported thereby to be movable along the optical axis O with respect to the housing 110. The third lens frame 5 is guided in the optical axis direction by first and second guide shafts 11 and 12 which extend parallel to the optical axis O.

As shown in FIG. 1, the third lens frame 5 is composed of a lens frame portion 51, a cylindrical portion 52, a projecting portion 53 and a blade portion 54. The lens frame portion 51 has a substantially circular ring shape, and is fixed to the rim of the third lens group L3. The cylindrical portion 52 has a guide hole in which the first guide shaft 11 is inserted. The projecting portion 53 extends rearward from the lens frame portion 51, and is provided at the rear end thereof with a bifurcated portion having a groove 531 in which the second guide shaft 12 is engaged. The blade portion 54 is formed to be capable of entering a home position sensor 14, which will be discussed in detail later.

As shown in FIG. 2, a motor driver 16 and a stop-position controller (CPU) 15 is provided. The stop-position controller 15 determines the position of the third lens group L3 based on detection signals received from the home position sensor 14, and controls the driving of the motor 4 via a motor driver 16.

The cylindrical portion 52, the projecting portion 53 and the blade portion 54 extend rearward from an outer peripheral portion of the lens frame portion 51. The cylindrical portion 52 and the projecting portion 53 are formed on the lens frame portion 51 on substantially opposite sides of the optical axis O.

The rear ends of the first and second guide shafts 11 and 12 are fixed to a rear end wall 111 of the housing 110 to be supported thereby, while the front ends of the first and second guide shafts 11 and 12 are fixed to a shaft supporting member 13 to be supported thereby. The first and second guide shafts 11 and 12, the cylindrical portion 52, and the groove 531 constitute a linear guide mechanism.

The shaft supporting member 13 is provided with a substantially C-shaped frame portion 131, two supporting arms 132 and 133 and a connecting portion 134. The frame portion 131 is positioned around the lens frame portion 51 of the third lens frame 5. The two supporting arms 132 and 133 extend forward in parallel to each other from the opposite ends of the C-shaped frame portion 131, respectively. The connecting portion 134 extend in a direction substantially orthogonal to the two supporting arms 132 and 133 to connect the front ends of the two supporting arms 132 and 133.

As shown in FIG. 2, the frame portion 131 of the shaft supporting member 13 is fixed to a fixing portion 112 by a known fixing device such as set screws (not shown). The fixing portion 112 extends forward from the rear end wall 111 of the housing 110.

The front end of the first guide shaft 11 is supported by the connecting portion 134, while the front end of the second guide shaft 12 is supported by the frame portion 131 at a central portion thereof.

The feed screw shaft 3 is disposed in the vicinity of the first guide shaft 11 to be parallel to the first guide shaft 11.

The front end of the feed screw shaft 3 is supported by the connecting portion 134 to be freely rotatable, while the rear end of the feed screw shaft 3 is supported by the rear end wall 111 of the housing 110 to be freely rotatable. Accordingly, the feed screw shaft 3 is rotatable relative to the housing 110.

The feed screw shaft 3 is provided with the male thread portion 31 and a non-threaded portion 32 which is positioned behind the male thread portion 31.

The male thread portion 31 is formed on the feed screw shaft 3 in a range from a portion of the feed screw shaft 3 in the vicinity of the front end thereof to an approximate center thereof. The male thread portion 31 is normally engaged with the female thread portion 61 of the nut member 2.

The diameter of the non-threaded portion 32 is smaller than the inner diameter of the screw hole formed on the nut portion 6 of the nut member 2 (i.e., the inner diameter of the female thread portion 61), so that the non-threaded portion 32 can be inserted into the screw hole of the nut portion 6 as shown in FIG. 3. The axial length of the non-threaded portion 32 is greater than the axial length of the female thread portion 61 of the nut portion 6 of the nut member 2 so that the female thread portion 61 can fully be positioned on the non-threaded portion 32.

It is desirable that the outer diameter of the non-threaded portion 32 be substantially identical to or slightly smaller than the inner diameter of the screw hole formed on the nut portion 6 of the nut member 2 so that the female thread portion 61 of the nut portion 6 can smoothly move back onto the male thread portion 31 from the non-threaded portion 32.

The feed screw shaft 3 is provided immediately behind the rear end of the non-threaded portion 32 with a large diameter portion 33, and is further provided immediately behind the large diameter portion 33 with an annular flange portion 34, which extends radially outwards from the feed screw shaft 3.

The lens drive system 1 is provided with a pinion gear 41. The pinion gear 41 is tightly fitted on the feed screw shaft 3 on a portion thereof behind the flange portion 34 to be fixed to the feed screw shaft 3. The pinion gear 41 is engaged with an intermediate gear 42 which is engaged with a pinion gear (drive gear) 44 fitted fixedly on a rotating shaft 43 of the motor 4. The motor 4 is positioned outside the housing 110 by an outer peripheral surface thereof as shown in FIG. 2. With this arrangement, the feed screw shaft 3 is driven by the motor 4 to rotate in the same rotational direction as the rotating shaft 43 of the motor 4.

The motor 4 is, e.g., a step motor which is driven with a pulse signal from the motor driver 16 so that a desired angle of rotation (the number of rotation) can be obtained according to the input number of pulses.

Figure 4:
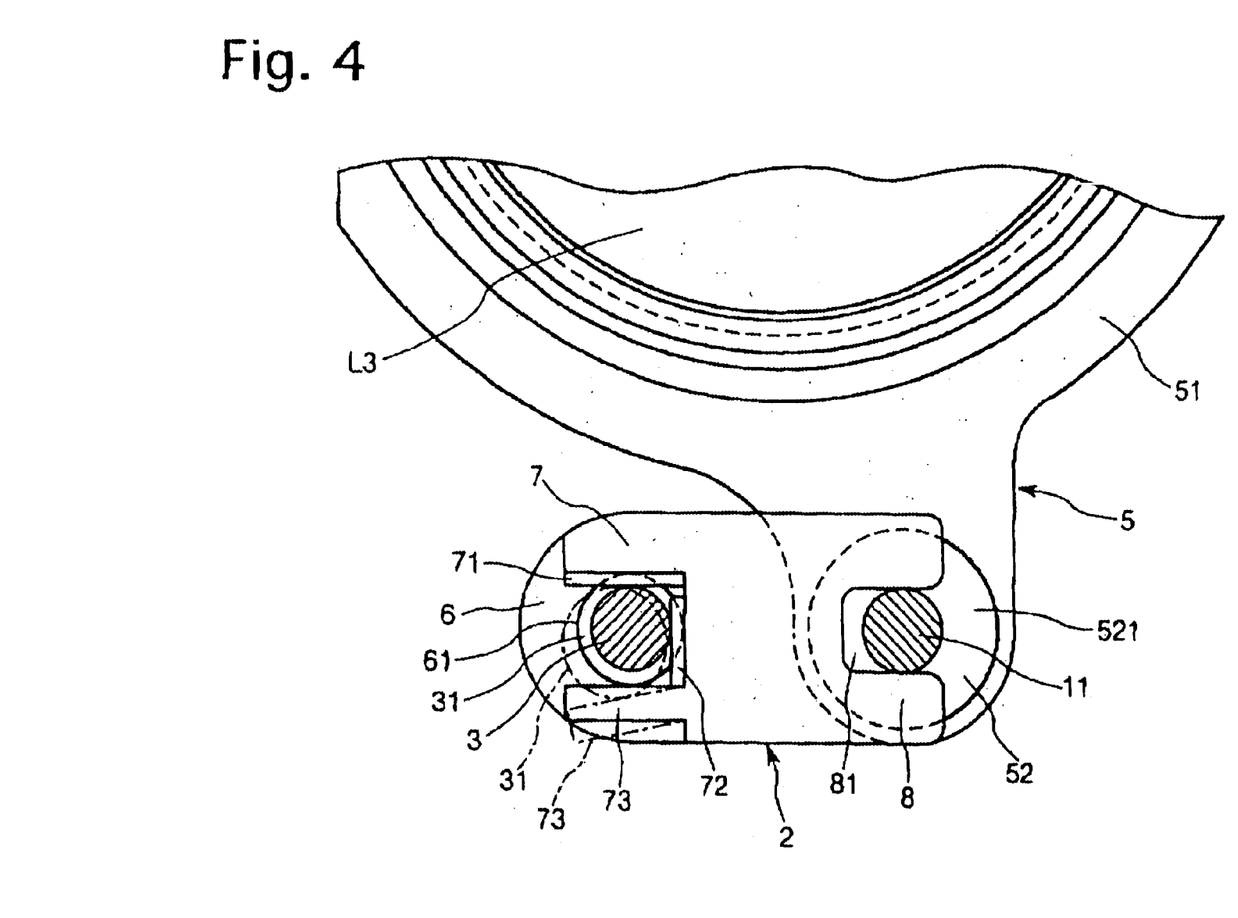
FIG. 4 is a cross sectional view taken along Y—Y line shown in FIG. 2.

As shown in FIGS. 1, 2 and 4, the nut member 2 is provided with the nut portion 6, an engagement portion 7, and a projecting portion 8. The nut portion 6 is provided with the female screw thread 61 as described above. The engagement portion 7 is provided with a first screw-engaging arm (portion) 71 and a second screw-engaging arm (portion) 72 both of which are engaged with the male thread portion 31 of the feed screw shaft 3. The projecting portion 8 is provided with a guide groove (guide recess) 81 in which the first guide shaft 11 is engaged.

The nut portion 6 is shaped as a flat plate, and is provided at an approximate center thereof with a screw hole. The nut portion 6 is provided on an inner peripheral surface of the screw hole with the female thread portion 61 that is engaged with the male thread portion 31 of the feed screw shaft 3. The female thread portion 61 is normally positioned on the male thread portion 31 to be engaged therewith as shown in FIG. 2.

The first guide shaft 11 is engaged in the guide groove 81 so that the nut member 2 is prevented from rotating about the axis of the feed screw shaft 3 with respect to the housing 110. Due to this structure in a state where the female thread portion 61 of the nut member 2 is engaged with the male thread portion 31 of the feed screw shaft 3, a rotation of the feed screw shaft 3 causes the nut member 2 to move along the feed screw shaft 3 thereon.

In the nut member 2, the engagement portion 7 is positioned in front of the nut portion 6. Since the first and second screw-engaging arms 71 and 72 of the engagement portion 7 are engaged with the male thread portion 31, the engagement portion 7 is forced by rotation of the feed screw shaft 3 to move in an axial direction of the feed screw shaft 3 therealong when the feed screw shaft 3 rotates. With this force exerted on the engagement portion 7, the engagement portion 7 functions to move the female thread portion 61 back onto the male thread portion 31 when the female thread portion 61 is positioned on the non-threaded portion 32.

In the present embodiment of the lens drive system, each of the first and second screw-engaging arms 71 and 72 of the engagement portion 7 is composed of three straight ridges (thread ridges) which extend parallel to one another to be engaged with the male thread portion 31 of the feed screw shaft 3.

As shown in FIG. 4, the first screw-engaging arm 71 is engaged with the male thread portion 31 at the upper side as viewed in FIG. 4 while the second screw-engaging arm 72 is engaged with the male thread portion 31 at the right side thereof as viewed in FIG. 4. Namely, the three ridges of the first screw-engaging arm 71 extend substantially orthogonal to the three ridges of the second screw-engaging arm 72. With the structure making the first and second screw-engaging arms 71 and 72 engaged with the male thread portion 31 of the feed screw shaft 3 from different directions, the three ridges of each of the first and second screw-engaging arms 71 and 72 are securely engaged with the male thread portion 31. This makes it possible to move the female thread portion 61 back onto the male thread portion 31 from the non-threaded portion 32 more securely.

The engagement portion 7 is further provided with a guide portion 73 for preventing the first and second screw-engaging arms 71 and 72 from being disengaged from the male thread portion 31. The guide portion 73 is formed like a square bar extending rightwards from the nut member 2 as viewed in FIG. 4 to be in contact with the male thread portion 31 from bottom as viewed in FIG. 4. Namely, the guide portion 73 and the first screw-engaging arm 71 are formed on the nut member 2 on the opposites side of the feed screw shaft 3.

The engagement portion 7 is forced by rotation of the feed screw shaft 3 to move in an axial direction of the feed screw shaft 3 therealong when the feed screw shaft 3 rotates as mentioned above. If this force exerted on the engagement portion 7 becomes greater than a predetermined value, the first and second screw-engaging arms 71 and 72 are disengaged from the male thread portion 31, so that the male thread portion 31 idles with respect to the engagement portion 7.

Namely, at least a part of the engagement portion 7 of the nut member 2 is resilient so that the first and second screw-engaging arms 71 and 72 can be disengaged from the male thread portion 31.

Specifically, the first and second screw-engaging arms 71 and 72 can be disengaged from the male thread portion 31 due mainly to the resiliency of the guide portion 73 in the present embodiment of the lens drive system. Namely, if the force exerted on the engagement portion 7 becomes greater than a predetermined value, the ridges of each of the first and second screw-engaging arms 71 and 72 are acted upon by a force to surmount the currently-engaged screw threads of the male thread portion 31. This force resiliently bends the guide portion 73 downwards as viewed in FIG. 4, as shown by one-dot chain lines in FIG. 4. This bend of the guide portion 73 allows the first and second screw-engaging arms 71 and 72 to be disengaged from the male thread portion 31 of the feed screw shaft 3 as shown a by one-dot chain line in FIG. 4, to thereby allow each ridge of each of the first and second screw-engaging arms 71 and 72 to surmount the currently-engaged screw thread of the male thread portion 31 to be shifted to an adjacent root of the male thread portion 31.

Accordingly, if the force exerted on the engagement portion 7 becomes greater than a predetermined value, each ridge of each of the first and second screw-engaging arms 71 and 72 repeatedly surmounts screw threads of the male thread portion 31, and accordingly, the engagement portion 7 does not move along the feed screw shaft 3 thereon even if the feed screw shaft 3 rotates. Consequently, the male thread portion 31 idles with respect to the engagement portion 7.

The magnitude of the force exerted on the engagement portion 7 to make the first and second screw-engaging arms 71 and 72 disengaged from the male thread portion 31 is determined to be an appropriate magnitude so that the engagement portion 7 can function to move the female thread portion 61 back onto the male thread portion 31 when the female thread portion 61 is positioned on the non-threaded portion 32 and so that the male thread portion 31 is not prevented from idling with respect the engagement portion 7. Such a magnitude of the force exerted on the screw-engaging arm 7 can be determined by principally varying the thickness (bending stress) of the guide portion 73.

As shown in FIG. 2, in the illustrated embodiment of the lens drive system, the projecting portion 8 of the nut member 2 is shaped like a plate and extends rightwards from the engagement portion 7 as viewed in FIG. 4. A front end surface 521 of the cylindrical portion 52 is pressed against a rear surface 82 of the projecting portion 8 of the nut member 2 by a spring force of the helical compression spring 9.

In the nut member 2 having the above described structure, the nut portion 6, the engagement portion 7 and the projecting portion 8 are formed integral with one another. The material of the nut member 2 is not limited solely to a particular material, but is desirably made of a relatively hard synthetic resin in consideration of the necessity for giving an appropriate resiliency to the guide portion 73.

The nut member 2 can be made of different portions having different materials. For instance, the nut portion 6 of the nut member 2 can be made of a metal while the remaining portion of the nut member 2 can be made of a synthetic resin.

The helical compression spring 9 biases the third lens frame 5 in a direction from the non-threaded portion 32 toward the male thread portion 31, i.e., toward the front of the lens barrel 100.

The helical compression spring 9 is loosely fitted on the cylindrical portion 52 of the third lens frame 5. In other wards, the cylindrical portion 52 is inserted into the helical compression spring 9. The front end of the helical compression spring 9 is in contact with a portion of the lens frame portion 51 in the vicinity of the front end of the cylindrical portion 52, while the rear end of the helical compression spring 9 is in contact with the rear end wall 111 of the housing 110.

The helical compression spring 9 is fitted on the cylindrical portion 52 in a compressed state to always bias the third lens frame 5 toward the front of the lens barrel 100. This causes a front end surface 521 of the cylindrical portion 52 to press against a rear end surface of the nut member 2 in the vicinity of the guide groove 81.

Due to this structure, if the nut member 2 moves in a direction from the male thread portion 31 toward the non-threaded portion 32, i.e. toward the rear of the lens barrel 100, by a rotation of the feed screw shaft 3 in a predetermined rotational direction, the nut member 2 presses the front end surface 521 of the cylindrical portion 52 so that the third lens frame 5 moves toward the rear of the lens barrel 100 together with the nut member 2. On the other hand, if the nut member 2 moves toward the front of the lens barrel 100 by a rotation of the feed screw shaft 3 in the opposite rotational direction, the third lens frame 5 moves toward the front of the lens barrel 100 together with the nut member 2 by a spring force of the helical compression spring 9.

Accordingly, the lens drive system 1 can move the third lens group L3 that serves as a focusing lens group, to an in-focus position on the optical axis O which corresponds to an object distance.

The digital camera which incorporates the lens drive system 1 having the above described structure is provided with the stop-position controller 15 including a microcomputer. The stop-position controller 15 optically detects an axial position of the third lens frame 5, drives the motor 4 via the motor driver 16 in accordance with the detected position of the third lens frame 5, and stops the third lens frame 5 at a predetermined position (stop position).

The stop-position controller 15 is provided with the home position sensor 14. The home position sensor 14 is disposed in the vicinity of the third lens frame 5 to optically sense whether the third lens frame 5 (specifically, the rear end of the blade portion 54 of the third lens frame 5) is positioned at a home position (initial position) S (see FIGS. 2 and 3).

FIG. 2 shows a state where the third lens frame 5 is in the home position S, at which the female thread portion 61 of the nut member 2 is positioned on the male thread portion 31 of the feed screw shaft 3.

In the case where an object which is to be photographed is at infinity, the object at infinity is in focus if the third lens frame 5 is located at a predetermined position in the vicinity of the home position S on the front side thereof. As an object to be photographed is closer to the lens barrel 100, the third lens frame 5 needs to be located at a position closer to the front of the lens barrel 100 to bring the object into focus.

The home position sensor 14 is provided with a light emitting element and a light receiving element which receives light emitted by the light emitting element. The blade portion 54 of the third lens frame 5 can be inserted in between the light emitting element and the light receiving element to interrupt light emitted by the light emitting element to the light receiving element.

In the home position sensor 14, the light receiving element receives light emitted by the light emitting element when the third lens frame 5 is positioned in front of the home position S, i.e., when the blade portion 54 is positioned at a position not interrupting light emitted by the light emitting element to the light receiving element. In this state, if the third lens frame 5 moves rearward to pass the home position S, the blade portion 54 interrupts light emitted by the light emitting element to the light receiving element. Accordingly, when the light receiving element of the home position sensor 14 senses no light emitted by the light emitting element, the home position sensor 14 detects (determines) that the third lens frame 5 has passed the home position S. In this state, if the third lens frame 5 is moved forward, toward the front of the lens barrel 100, by a slight amount, an axial position of the third lens frame 5 at which the light receiving element can receive light emitted by the light emitting element is detected. This position corresponds to the home position S, which may be slightly adjusted according to an individual difference.

The stop-position controller 15 can stop the third lens frame 5 at the home position S according to the above described operation. The home position sensor 14 can be replaced by an electrical home position sensor which electrically senses a position of the third lens frame 5.

Operations of the lens drive system 1 will be hereinafter discussed in detail.

[1] The digital camera which incorporates the lens drive system 1 (hereinafter referred to as simply "digital camera") obtains information on an object distance from a distance measuring device (not shown) provided in the digital camera when a picture is taken. The motor 4 is driven in accordance with the information on an object distance to rotate the feed screw shaft 3. This rotation of the feed screw shaft 3 moves the third lens frame 5 forward from the home position S shown in FIG. 2 to an in-focus position corresponding to the object distance.

[2] If the power of the digital camera is turned OFF after a picture is taken, the motor 4 is driven to rotate the feed screw shaft 3 in a predetermined rotational direction to move the third lens frame 5 rearward (i.e., retracting direction). Thereafter, it is normally the case that the third lens frame 5 stops at the home position S upon returning thereto, and subsequently the lens barrel 100 is fully retracted to reach an accommodation state.

However, when the lens barrel 100 is fully retracted after the power of the lens barrel 100 is turned OFF, there is a possibility of the stop-position controller 15 malfunctioning, for some reason such as abuse of control software of the digital camera. If such a malfunction occurs, the home position sensor may not detect that the third lens frame 5 passes the home position S. In this case, the motor 4 does not stop, and therefore the feed screw shaft 3 continues to rotate in the retracting direction to move the third lens frame 5 rearward. Consequently, the third lens frame 5 is moved rearward overly, beyond the home position S.

[3] If the feed screw shaft 3 continues to rotate in the retracting direction to move the third lens frame 5 rearward after the third lens frame 5 passes the home position S, the nut member 2 and the third lens frame 5 move further rearward and thereafter stop moving by a rear end surface 522 of the cylindrical portion 52 abutting against the rear end wall 111 of the housing 110. FIG. 3 shows this state where the rear end surface 522 of the cylindrical portion 52 is in contact with the rear end wall 111 of the housing 110.

In this state shown in FIG. 3, the female thread portion 61 of the nut member 2 is disengaged with the male thread portion 31 of the feed screw shaft 3 to have moved onto the non-threaded portion 32, while the first and second screw-engaging arms 71 and 72 of the engagement portion 7 of the nut member 2 remain on the male thread portion 31.

As can be understood from the above description, in the present embodiment of the lens drive system 1, since the female thread portion 61 is positioned on the non-thread portion 32 when the nut member 2 and the third lens frame 5 stop moving by the rear end surface 522 of the cylindrical portion 52 abutting against the rear end wall 111 of the housing 110, the problem causing the female thread portion 61 of the nut member 2 and the male thread portion 31 of the feed screw shaft 3 to tightly fasten or lock themselves on each other can reliably be prevented from occurring.

In a state shown in FIG. 3, although the engagement portion 7 is formed by rotation of the feed screw shaft 3 to move rearward when the feed screw shaft 3 rotates in the aforementioned predetermined rotational direction, the screw-engaging arms 71 and 72 of the engagement portion 7 are disengaged from the male thread portion 31 so that the male thread portion 31 idles with respect to the engagement portion 7 since the nut member 2 together with the third lens frame 5 are in unable to further move rearward. Accordingly, each of the first and second screw-engaging arms 71 and 72 of the nut member 2 and the male thread portion 31 of the feed screw shaft 3 do not tightly fasten or lock themselves on each other.

[4] In a state shown in FIG. 3, driving the feed screw shaft 3 in a rotational direction reverse to the aforementioned retracting direction by the motor 4 (i.e., advancing direction) causes the engagement portion 7 to be forced to move forward. If the feed screw shaft 3 keeps being driven to rotate in the same rotational direction, firstly the female thread portion 61 is engaged, from the front end thereof, with the male thread portion 31, and eventually moves back onto the male thread portion 31.

As can be understood from the above description, in the case where the female thread portion 61 is positioned on the non-threaded portion 32, if the feed screw shaft 3 is driven in the reverse rotational direction (advancing direction), the nut member 2 is drawn back by the male thread portion 31 with a force which is exerted on the engagement portion 7 to move the engagement portion 7 forward, so that the female thread portion 61 securely and smoothly moves back onto the male thread portion 31.

[5] After the female thread portion 61 of the nut member 2 returns onto the female thread portion 31, the feed screw shaft 3 is made to keep rotating in the advancing direction. Subsequently, the motor 4 is stopped immediately after the light-receiving element of the home position sensor 14 senses light emitted by the light emitting element of the home position sensor 14 to thereby stop the third lens frame 5 at the home position S.

As can be understood from the above description, the female thread portion 61 of the nut member 2 and the male thread portion 31 of the feed screw shaft 3 do not tightly fasten or lock themselves on each other even if the motor 4 accidentally continues to rotate after the third lens frame 5 retreats beyond the home position S. Accordingly, such a problem which makes it impossible to rotate the feed screw shaft 3 can reliably be prevented from occurring.

Accordingly, even if the stop-position controller 15 should malfunction, an adverse effect on the lens drive system 1 due to the malfunction can be avoided.

Contrary to the present embodiment of the lens drive system 1, in a conventional lens drive system, if the feed screw shaft continues to be rotated by motor until a lens frame which corresponds to the third lens frame 5 or a nut member which corresponds to the nut member 2 abuts against another member and stops thereby, the nut member may tilt by the impact and/or the nut member and the feed screw shaft which are engaged with each other may tightly fasten themselves on each other by the impact. This may make any further rotation of the feed screw shaft relative to the nut member impossible. Specifically, in the case where the pitch of the male and female thread portions (which respectively correspond to the male and female thread portions 31 and 61) is set small to move a lens group (which corresponds to the third lens group L3) with a high degree of precision, the nut member and the feed screw shaft can easily tightly fasten or lock themselves on each other if the lens frame or the nut member abuts against another member.

In the present embodiment of the lens drive system, according to the above described operations of the lens drive system, the problem causing the nut member and the feed screw shaft to tightly fasten themselves on each other can be reliably prevented from occurring. Consequently, the present embodiment of the lens drive system is particularly effective when a lens group needs to be driven with a high degree of precision.

According to the present embodiment of the lens drive system, the axial length of the lens barrel 100 in an accommodation state is successfully shortened due to the structure making the third lens frame 5 pressed against the nut member 2 by the helical compression spring 9. Namely, if the third lens frame 5 is pressed rearward against the spring force of the helical compression spring 9 when the lens barrel 100 retreats while the third lens frame 5 retreats to the home position S to enter the accommodation state, the first lens frame 170 and the second lens frame 180 can further retreat rearward, toward the rear end of the lens barrel 100, since the third lens frame 5 can retreat until the rear end surface 522 of the cylindrical portion 52 comes into contact with the rear end wall 111 of the housing 110.

The helical compression spring 9 that serves as a biasing member can be any other biasing member as long as it can provide a biasing force or a spring force. For instance, the helical compression spring 9 can be replaced by another type of spring such as a torsion spring or a leaf spring, or a resilient member such as a rubber member.

However, if miniaturization of the lens barrel 100 in the accommodation state does not have to be taken into account, it is not necessary to provide the lens drive system 1 with the helical compression spring 9, i.e., the lens drive system 1 can be modified so that the nut member 2 and the third lens frame 5 do not move away from each other, so that the nut member 2 is attached to the third lens frame 5, or so that the nut member 2 is formed integral with the third lens frame 5.

A washer or a similar member can be disposed between the nut member 2 and the cylindrical portion 52 of the third lens frame 5. Although the third lens frame 5 holds only one lens element (the third lens group L3) in the illustrated embodiment, the third lens frame 5 can be a lens frame which holds more than one lens element.

The stop-position controller 15 having the above described structure, which optically detects an axial position of the third lens frame 5, can be omitted in the illustrated embodiment of the lens drive system. However, with the stop-position controller 15 the reliability of the lens drive system 1 is improved.

Obvious changes may be made in the specific embodiment of the present invention described herein, such modifications being within the spirit and scope of the invention claimed. It is indicated that all matter contained herein is illustrative and does not limit the scope of the present invention.

For instance, although the engagement portion 7 is provided with two screw-engaging arms: the first and second screw-engaging arms 71 and 72 in the above illustrated embodiment of the lens drive system, the engagement portion 7 can be provided with only one screw-engaging arm or more than two screw-engaging arms. In addition, in the case where each screw-engaging arm of the engagement portion 7 is composed of at least one thread ridge, each screw-engaging arm of the engagement portion 7 can be provided with only one thread ridge or more than three thread ridges.

Although composed of at least one thread ridge in the above illustrated embodiment, each screw-engaging arm of the engagement portion can be formed as a projecting portion (claw-shaped portion), a ring-shaped portion or a C-shaped portion. In addition, the engagement portion of the nut member can be provided with a biasing member such as a spring which biases each screw-engaging arm of the engagement portion toward the male thread portion of the feed screw shaft so that each screw-engaging arm of the engagement portion can be disengaged from the male thread portion of the feed screw shaft by a bending of the biasing member. The engagement portion can be provided with no guide portion such as the guide portion 73.

The lens drive system according to the present invention can be incorporated in not only cameras but also other optical devices.

As can be understood from the above description, according to a lens drive system to which the present invention is applied, the problem of the nut member and the feed screw shaft tightly fastening or locking themselves on each other is reliably prevented from occurring since a non-threaded portion is formed on the feed screw shaft so that the female thread portion of the nut portion of the nut member can move onto the non-threaded portion. Accordingly, the feed screw shaft cannot become incapable of rotating relative to the nut member even if the third lens frame retreats beyond the home position.

Moreover, since the nut member is provided with an engagement portion having at least one screw-engaging arm which is engaged with the male thread portion of the feed screw shaft, the female thread portion of the nut member can smoothly and securely move back onto the male thread portion of the feed screw shaft from the non-threaded portion thereof after the female thread portion moves onto the non-threaded portion.

What is claimed is:

1. A lens drive system comprising:

a lens frame having at least one lens element;

a nut member which is secured to said lens frame, said lens frame and said nut member being movable in an optical axis direction without rotating relative to a base of said lens drive system, the direction of a screw hole of said nut member being parallel with the optical axis;

a feed screw shaft having a male thread portion and a non-threaded portion, said male thread portion being engaged with said screw hole of said nut member so that said male thread portion is engaged with a female thread portion formed on an inner peripheral surface of said screw hole, a diameter of said non-threaded portion being smaller than an inner diameter of said screw hole;

an engagement portion formed on said nut member, said engagement portion having at least one deformable screw-engaging portion which is engaged with said male thread portion; and a motor for rotating said feed screw shaft;

wherein said engagement portion is forced by rotation of said feed screw shaft to move in an axial direction of said feed screw shaft;

wherein said screw-engaging portion is disengaged from said male thread portion so that said male thread portion idles with respect to said engagement portion when a force greater than a predetermined value is applied to said engagement portion via said rotation of said feed screw shaft in said axial direction thereof; and wherein, when the linear movement of said lens frame and said nut member is restricted during the rotation of said feed screw shaft to move said nut member and said lens frame in a direction from said male thread portion toward said non-thread portion, said engagement portion of said nut member remains on said male thread portion of said feed screw shaft while said female thread portion of said nut member is disengaged from said male thread portion of said feed screw shaft to move onto said non-thread portion of said feed screw shaft.

2. The lens drive system according to claim 1, wherein, in the case where said feed screw shaft is rotated in a rotational direction reverse to said predetermined rotational direction by said motor in a state where said female thread portion of said nut member is positioned on said non-thread of said feed screw shaft, said engagement portion is forced by a reverse rotation of said feed screw shaft by said motor so that said female thread portion of said nut member moves back onto said male thread portion.

3. The lens drive system according to claim 1, wherein said portion of said engagement portion is resilient so that said screw-engaging portion can be disengaged from said male thread portion.

4. The lens drive system according to claim 1, wherein said screw-engaging portion comprises at least one thread ridge which is engaged with said male thread portion of said feed screw shaft.

5. The lens drive system according to claim 1, wherein said screw-engaging portion comprises at least two screw-engaging portions which are engaged with said male thread portion of said feed screw shaft from different directions.

6. The lens drive system according to claim 1, wherein said engagement portion comprises a guide portion for preventing said screw-engaging portion from being disengaged from said male thread portion, said engagement portion being deformed to allow said screw-engaging portion to be disengaged from said male thread portion when said force exerted on said engagement portion becomes greater than said predetermined value.

7. The lens drive system according to claim 1, further comprising a biasing member for biasing said lens frame in a second direction from said non-threaded portion toward said male thread portion;

wherein said nut member presses said lens frame to move said lens frame toward said non-threaded portion when said lens frame is driven to move in said direction from said male thread portion toward said non-threaded portion; and wherein said lens frame moves toward said male thread portion by a biasing force of said biasing member when said lens frame is driven to move in said second direction from said non-threaded portion toward said male thread portion.

8. The lens drive system according to claim 1, wherein said lens drive system is incorporated in a camera having a stop-position controller for optically detecting an axial position of said lens frame, for driving said motor in accordance with said detected axial position of said lens frame, and for stopping said lens frame at a predetermined axial position; and wherein, if said stop-position controller malfunctions, said lens drive system operates to avoid an adverse effect on said lens drive system due to said malfunction.

9. The lens drive system according to claim 6, wherein at least a portion of said engagement portion is resilient so that said guide portion can bend resiliently to allow said screw-engaging portion to be disengaged from said male thread portion when said force exerted on said engagement portion becomes greater than said predetermined value.

10. The lens drive system according to claim 1, wherein said lens element, which is held by said lens frame, comprises a focusing lens group of a photographing optical system.

11. The lens drive system according to claim 1, wherein said lens drive system is incorporated in a zoom lens barrel;

wherein said lens element, which is held by said lens frame, comprises a rearmost lens group serving as a focusing lens group of a photographing optical system; and wherein said base is formed as a part of a housing of said zoom lens barrel.

12. The lens drive system according to claim 1, wherein said lens frame is linearly guided in an optical axis direction without rotating about said optical axis.

13. The lens drive system according to claim 6, further comprising a linear guide mechanism for linearly guiding said lens frame in an optical axis direction without making said lens frame rotate relative to said base;

wherein said linear guide mechanism comprises a guide shaft extending parallel to said optical axis; and wherein said nut member comprises a guide recess in which said guide shaft is engaged to be slidable on said guide shaft.

14. The lens drive system according to claim 9, wherein said screw-engaging portion comprises at least two screw-engaging portions which are engaged with said male thread portion of said feed screw shaft from different directions; wherein said guide portion is formed so that one of said at least two screw-engaging portions is provided on the opposite side of said feed screw shaft with respect to the other of said at least two screw-engaging portions.

* * * * *